United States Patent [19]

Lagher

[11] 4,134,540

[45] Jan. 16, 1979

[54] BIMETALLIC ELEMENT

[75] Inventor: Gunnar H. Lagher, Fjalkinge, Sweden

[73] Assignee: Maj Agnes Andersson, Knypplerskevagen, Sweden

[21] Appl. No.: 730,867

[22] Filed: Oct. 8, 1976

[30] Foreign Application Priority Data

| | | | |
|---|---|---|---|
| Oct. 10, 1975 | [SE] | Sweden | 75113753 |
| Feb. 19, 1976 | [SE] | Sweden | 76019207 |

[51] Int. Cl.[2] .......... G01K 5/64

[52] U.S. Cl. .......... 236/34.5; 73/363.9

[58] Field of Search .......... 236/34.5, 101 C, 96, 236/101 D; 73/363.9, 363.7

[56] References Cited

U.S. PATENT DOCUMENTS

| | | | |
|---|---|---|---|
| 2,121,259 | 6/1938 | Parsons | 73/363.9 |
| 3,715,894 | 2/1973 | Widdowson | 236/101 D |

*Primary Examiner*—William E. Wayner

*Attorney, Agent, or Firm*—Burns, Doane, Swecker & Mathis

[57] ABSTRACT

A bimetallic element in which a bimetallic strip of two bands of different metals is wound helically into an elongated body, said body having in its center a free space, the diameter of which is smaller than the thickness of the bimetallic strip and preferably is essentially zero. By winding said elongated body into a helical spring, the outer diameter of which is substantially greater than the outer diameter of the elongated body, an element is obtained that can be used as a thermostatic actuating means in a thermostatic device.

15 Claims, 8 Drawing Figures

BIMETALLIC ELEMENT

The present invention relates to a bimetallic element, in which a bimetallic strip consisting of two bands of different metals joined to one another is helically wound into an elongated body with one of the bands facing outwardly.

Bimetallic elements of this type are previously known by, inter alia, U.S. Pat. No. 2,121,259 from 1938. Such bimetallic elements, when subjected to a temperature change, produce a torsional effect along the axis of the helix. By winding, as suggested in said U.S. patent, the bimetallic element itself into a helical spring a temperature change can be made to produce a change in the length of the spring. The disadvantage is, however, that the helical spring takes up much space since the bimetallic element has a central free space, the diameter of which substantially exceeds the thickness of the bimetallic strip. To obtain a certain change in the length of the spring for a certain change in the temperature, a large spring is required, which will also be quite weak and produce a small actuating force when, for example, it is included in a thermostatic valve.

The purpose of the invention is to eliminate these disadvantages and to produce a bimetallic element which, with as little size as possible, produces as large an amount of motion and force as possible for a given change in temperature.

This is achieved according to the invention by making the diameter of the free space in the center of the body smaller than the thickness of the bimetallic strip, preferably essentially zero, thus giving the elongated body a wire-like shape.

A bimetallic element is thus obtained which produces, in relation to its size, a large amount of motion and force for a given temperature change.

According to an especially advantageous embodiment, the elongated body is wound into a helical spring, the outer diameter of which is substantially greater than the outer diameter of the elongated body. With a spring of this type a large axial force can be obtained in a limited axial space.

Figure 1:
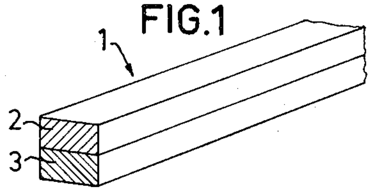
Figure 2:
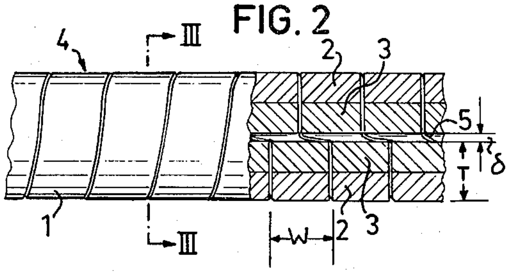
Figure 3:
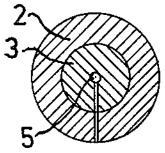
Figure 4:
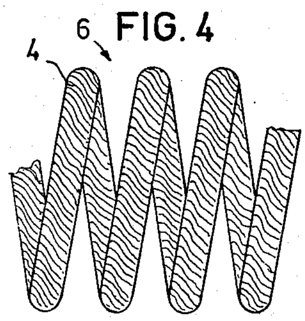
Figure 5:
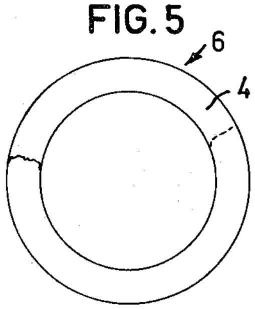
Figure 6:
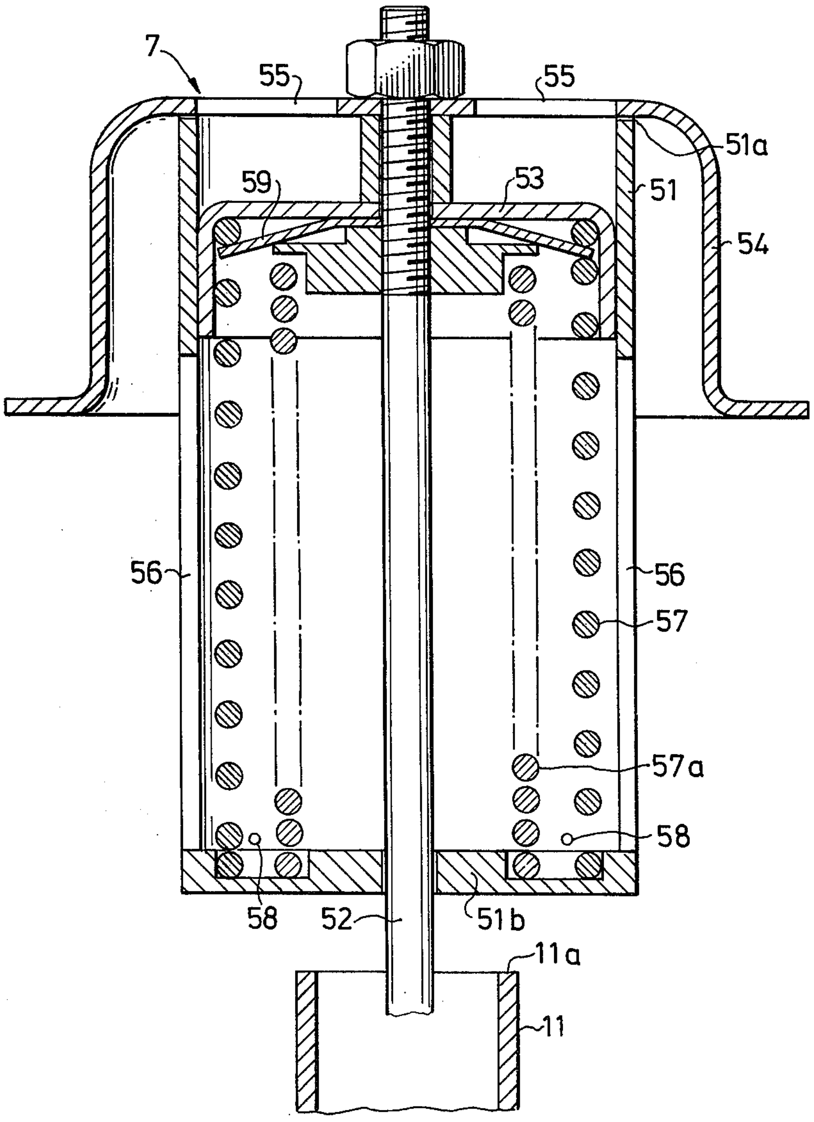
Figure 7:
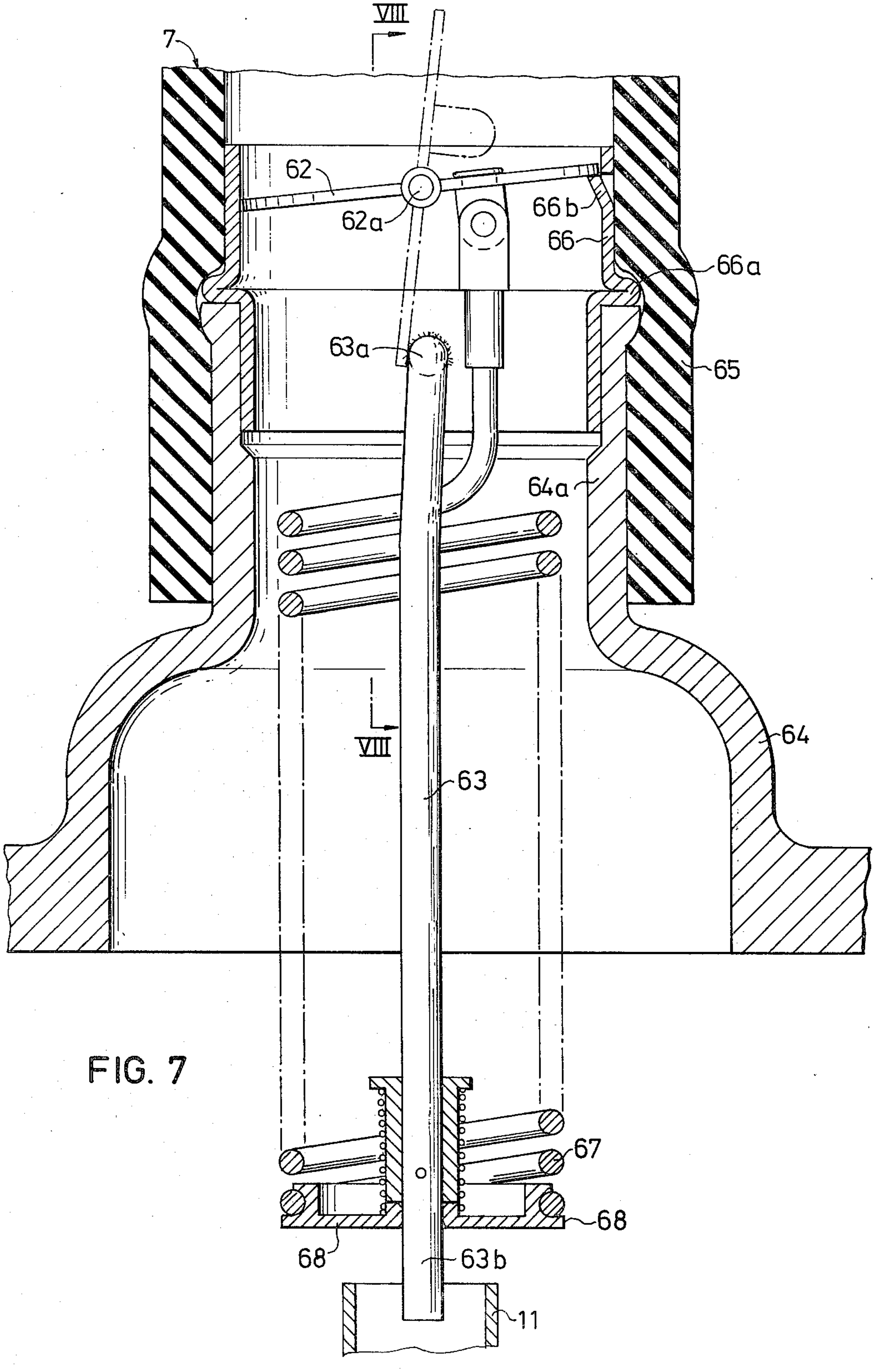
Figure 8:
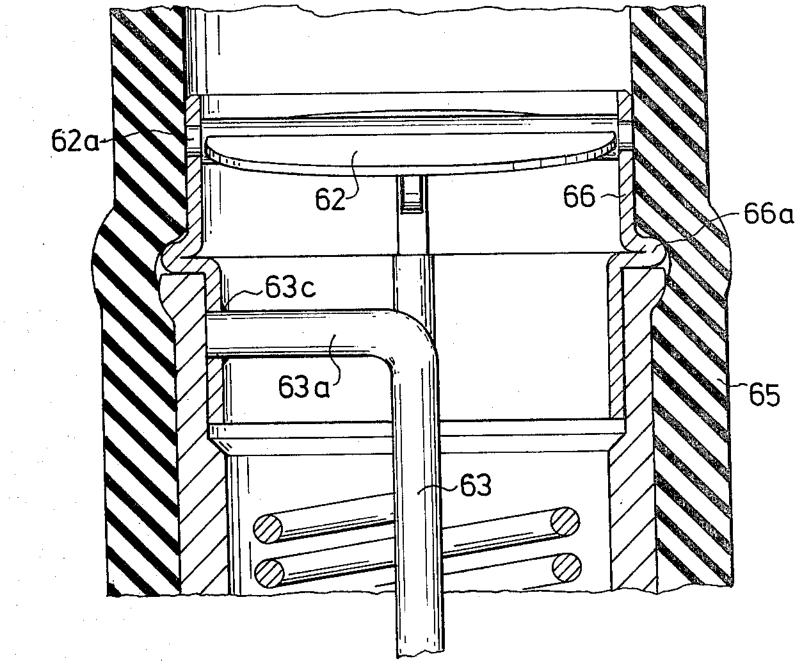

The invention is described in the following with reference to the embodiments shown in the accompanying drawings in which FIG. 1 shows a bimetallic strip, FIG. 2 shows a side view, partially in longitudinal section, of a bimetallic element according to the invention, FIG. 3 shows a section along the line III—III in FIG. 2, FIG. 4 shows a side view of a helically wound bimetallic element according to the invention, FIG. 5 shows an end view of the bimetallic element in FIG. 4, FIG. 6 shows a first embodiment of a thermostat with the bimetallic element according to FIG. 4, FIG. 7 shows a second embodiment of a thermostat with a bimetallic element according to FIG. 4, and FIG. 8 shows a section along the line VIII—VIII in FIG. 7.

A conventional bimetallic strip 1 according to FIG. 1 consists of two bands 2,3, joined to one another, of metals with different coefficients of thermal expansion.

A bimetallic element 4 according to the invention is obtained by winding a bimetallic strip 1 of this type helically into an elongated wire-like body according to FIG. 2, with one of the bands 2,3 facing outwards. The winding is done so that the pitch is smaller than 1.5 times the width W (FIG. 2) of the bimetallic strip, causing successive winds to lie quite close to one another, preferably essentially in contact with one another. Furthrmore, the winding is done so that the free space 5 formed in the center of each wind has as small a diameter $\delta$ as possible. The diameter $\delta$ of the free space 5 should suitably be substantially less than the thickness T (FIG. 2) of the bimetallic strip 1 and preferably essentially zero. To get the diameter of the free space 5 as close to zero as possible the bimetallic element 4, after the bimetallic strip 1 has been wound as tightly as possible, can be subjected to radially inwardly directed pressure, e.g. by rolling.

When the bimetallic element 4 is subjected to a temperature change it will produce a torsional effect around its longitudinal axis, so that there is a relative twisting, corresponding to the size of the temperature change, between the two end portions. The direction of the torsional motion produced depends on, inter alia, the direction of winding and which of the bands 2,3 has the greater or lesser coefficient of thermal expansion. Right-hand and left-hand windings give differently directed movements. The size of the torsional motion, for a given temperature change, depends on, among other things, the choice of metals in the bimetallic strip 1 and on its dimensions, which in turn determine the dimensions of the bimetallic element. The bimetallic element 1 can suitably have a rectangular or square cross-sectional shape, but other cross-sectional shapes are also possible.

FIGS. 4 and 5 show a bimetallic spring 6 where a bimetallic element 4 has been helically wound, so that the diameter of the bimetallic element 4 is substantially less than the diameter of the bimetallic spring 6. It is obvious that the bimetallic spring 6 can be wound with an arbitrary number of winds and with arbitrary pitch and diameter, as required. When the bimetallic spring 6 is subjected to a temperature change it will increase or decrease in length; and this change in length will be greater and more forceful than for a similar, conventional helical spring. The size of the change in length and the direction, for a given temperature change, is, of course, dependent on the dimensions of the spring and on the choice of bimetallic element 4. A spring 6 of the type shown here, for a given temperature change, causes a relatively great extension or contraction force, which can be exploited as an operating force, for example in a thermostat (thermostatic valve) or other temperature sensing and regulating means.

FIG. 6 shows a first embodiment of a thermostatic valve 7 using a bimetallic spring 6 according to FIGS. 4 and 5. This thermostatic valve is especially designed for automobile engines and other internal combustion engines to regulate the temperature of the coolant. The valve itself comprises a valve housing and a movable sleeve 51 disposed in the valve housing. The movement of the sleeve 51 is guided by a central rod 52 and a flange 53 attached to the upper portion of the rod. The upper portion 51*a* of the sleeve 51 seals against a cap 54 of the valve housing, the upper portion of which cap is provided with a number of outlet holes 55 for the coolant.

The sleeve 51 is provided with two or more axial slits 56 and is kept closed, i.e. with its upper sealing portion 51*a* in contact with the cap 54, with the aid of a tension spring 57. This tension spring 57 is a bimetallic spring 6 according to FIGS. 4 and 5 and is, at its lower end, attached to a plate 51*b* with the help of a pin 58 extending through the plate or the sleeve. The upper portion of the tension spring 57 cooperates with a spring strap 59 placed inside the flange 53.

The tension spring 57 is so dimensioned that its pulling force is essentially zero at the temperature at which the sleeve 51 is selected to open. A compression spring 57*a* is placed inside the tension spring 57. Said compression spring 57*a* has a small pitch and is also a bimetallic spring 6 according to FIGS. 4 and 5. The turns of the spring 57*a* should suitably be pretensioned against one another so that the spring does not produce pushing force until the temperature is reached at which the sleeve 51 is to open.

It is suitable to allow the two springs 57 and 57*a* to have a cooperative action such that the sleeve 51 begins to open at about 82° C., which means that the spring 57*a* pushes away the plate 51*b* and the sleeve 51 from the cap 54. The sleeve should assume a fully opened position at a temperature of about 90° C.

The flange 53 can advantageously be adjustable in relation to the rod 52 for regulation of the thermostatic valve so that it opens at a desired temperature.

Certain types of engines are provided with a return channel 11, which is connected to the heating conduit. It is desirable that this channel be able to be closed by the thermostatic valve. This can be done by the plate 51*b* being pressed down against the upper surface 11*a* of the return channel 11, thus sealing said return channel when the thermostatic valve is in the open position.

FIG. 7 shows another embodiment of a thermostatic valve 7 using a bimetallic spring according to FIGS. 4 and 5. This thermostatic valve is also especially designed to be used in internal combustion engines to regulate the temperature of the coolant and it should be placed at an upper coolant conduit. The thermostatic valve 7 is mounted in a cap 64 in the engine block and said cap 64 has an upper portion 64*a* which is intended to house the actual thermostatic valve. A hose 65, the upper coolant hose, is with one end mounted around the portion 64*a*.

The thermostatic valve comprises a pipe 66, which has a flange 66*a* which is abutting the upper end of the upper portion 64*a*. Also there is a throttle 62, which is pivotable around an axle 62*a* mounted in the pipe 66. The throttle 62 is shown with solid lines in a closed position and with dashed lines in an open position. A rod 63 is attached at its upper end 63*a* to the pipe 66 and extends downwards through a helically wound spring 67 of bimetallic type, constructed in accordance with FIGS. 4 and 5. The lower portion of the rod 63 cooperates with a washer 68, which can, with advantage, be adjustably attached to the rod 63, for example with the help of a nut. In this manner the bimetallic spring 67, which at its upper end is pivotably secured to the throttle 62, can be adjustably attached to the lower portion of the rod 63 and the pretension of the spring 67 can thereby be regulated. If the temperature increases the spring 67 will expand in the direction of the arrow "B", which means that the throttle 62 will open. There is an abutment 66*b* in the pipe 66, against which abutment the throttle 62 lies in the closed position.

The lower portion of the rod 63, designated 63*b*, cooperates with a return channel 11, in a corresponding manner to that described in connection with FIG. 6.

FIG. 8 shows the pipe 66 with the flange 66*a* and the throttle 62 in another projection. From this it is evident that the rod 63 has an angularly bent part 63*a*, which is attached, by a weld 63*c* for example, to the pipe 66. The pivot axle 62*a*for the throttle 62 is attached in the pipe 66.

What I claim is:

1. A bimetallic element comprising a bimetallic strip including two bands of different metals joined to one another and helically wound to form an elongated body with one of the bands facing outwardly and the other of the bands facing inwardly, the strip being wound such that the free space defined by the inwardly facing band in the center of the elongated body has a diameter substantially smaller than the thickness of the bimetallic strip, giving the elongated body a wire-like shape.

2. A bimetallic element according to claim 1 wherein the free space defined by the inwardly facing band in the center of the elongated body has a diameter of essentially zero.

3. A bimetallic element according to claim 1 characterized in that the band which has the lower coefficient of thermal expansion faces outwardly.

4. A bimetallic element according to claim 3 characterized in that the bimetallic strip has a rectangular, preferably square, cross-sectional shape.

5. A bimetallic element according to claim 3 characterized in that the elongated body is wound into a helical spring, the outer diameter of which is substantially greater than the outer diameter of the elongated body.

6. A bimetallic element according to claim 5 characterized in that the bimetallic strip has a rectangular, preferably square, cross-sectional shape.

7. A bimetallic element according to claim 1, characterized in that the pitch is suitably less than 1.5 times the width of the bimetallic strip and preferably substantially equal to the width of the bimetallic strip.

8. A bimetallic element according to claim 1 characterized in that the elongated body is wound into a helical spring, the outer diameter of which is substantially greater than the outer diameter of the elongated body.

9. A bimetallic element according to claim 8 wherein the free space defined by the inwardly facing band in the center of the elongated body has a diameter of essentially zero.

10. A bimetallic element according to claim 7, characterized in that the band which has the lower coefficient of thermal expansion faces outwardly.

11. A bimetallic element according to claim 1, characterized in that the bimetallic strip has a rectangular, preferably square, cross-sectional shape.

12. A bimetallic element according to claim 1, characterized in that the elongated body is wound into a helical spring, the outer diameter of which is substantially greater than the outer diameter of the elongated body.

13. A thermostatic device, characterized in that it comprises as a thermostatic actuating means a bimetallic element according to claim 12.

14. A thermostatic device according to claim 13, characterized in that the actuating means is a valve actuating means in a thermostatic valve, especially for the coolant system of combustion engines, and is arranged to open and close said valve in response to a change in temperature.

15. A thermostatic device comprising a bimetallic strip formed of two bands of different metals joined to one another and helically wound to form an elongated body with one of the bands facing outwardly and the other of the bands facing inwardly, the strip being wound such that the free space defined by the inwardly facing band in the center of the elongated body has a diameter substantially smaller that the thickness of the bimetallic strip, the elongated body being helically wound to form a helical spring having an outer diameter substantially greater than the outer diameter of the elongated body.

* * * * *

UNITED STATES PATENT AND TRADEMARK OFFICE

CERTIFICATE OF CORRECTION

PATENT NO. : 4,134,540

DATED : January 16, 1979

INVENTOR(S) : Lagher

It is certified that error appears in the above-identified patent and that said Letters Patent are hereby corrected as shown below:

In the statement of Assignee [73], that portion reading:

"Maj Agnes Andersson,
Knypplerskevagen, Sweden"

should read:

-- Maj Agnes Andersson,
Bromma, Sweden,
a part interest --.

Signed and Sealed this

*Twenty-fifth* Day of *September 1979*

[SEAL]

*Attest:*

LUTRELLE F. PARKER

*Attesting Officer* *Acting Commissioner of Patents and Trademarks*